United States Patent
Gao

(10) Patent No.: US 11,356,410 B2
(45) Date of Patent: Jun. 7, 2022

(54) PACKET TRANSMISSION METHOD AND DEVICE, AND COMPUTER READABLE STORAGE MEDIUM

(71) Applicant: XI'AN ZHONGXING NEW SOFTWARE CO. LTD., Shaanxi (CN)

(72) Inventor: Fei Gao, Nanshan District (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/649,744

(22) PCT Filed: Sep. 18, 2018

(86) PCT No.: PCT/CN2018/106166
§ 371 (c)(1),
(2) Date: Mar. 23, 2020

(87) PCT Pub. No.: WO2019/062593
PCT Pub. Date: Apr. 4, 2019

(65) Prior Publication Data
US 2020/0267118 A1 Aug. 20, 2020

(30) Foreign Application Priority Data

Sep. 26, 2017 (CN) .......................... 201710884127.8

(51) Int. Cl.
| | | |
|---|---|---|
| G06F 15/16 | (2006.01) | |
| H04L 61/251 | (2022.01) | |
| H04L 45/74 | (2022.01) | |
| H04L 69/167 | (2022.01) | |
| H04L 69/22 | (2022.01) | |

(52) U.S. Cl.
CPC ............ *H04L 61/251* (2013.01); *H04L 45/74* (2013.01); *H04L 69/167* (2013.01); *H04L 69/22* (2013.01)

(58) Field of Classification Search
CPC ..... H04L 61/251; H04L 45/74; H04L 69/167; H04L 69/22
(Continued)

(56) References Cited

U.S. PATENT DOCUMENTS 8,982,794 B2 * 3/2015 Filgueiras ............... H04L 43/00
370/328
9,351,193 B2 5/2016 Raleigh
(Continued)

FOREIGN PATENT DOCUMENTS

| CN | 102394815 A | 3/2012 |
| CN | 104283923 A | 7/2013 |

(Continued)

OTHER PUBLICATIONS

International Search Report for corresponding application PCT/CN2018/106166 filed Sep. 18, 2018; dated Dec. 12, 2018.
(Continued)

*Primary Examiner* — Bharat Barot
(74) *Attorney, Agent, or Firm* — Vivacqua Crane, PLLC

(57) ABSTRACT

Provided are a packet transmission method and device and a computer readable storage medium. The packet transmission method includes: receiving, by the routing device, a packet, determining whether the packet is a packet that needs to be accelerated, in response to determining that the packet is the packet that needs to be accelerated, querying a customized connection tracking table to acquire connection tracking information corresponding to the packet, transmitting the packet to a driver layer for processing, where the customized connection tracking table includes connection tracking information of a packet corresponding to a packet type which is predetermined to be accelerated.

11 Claims, 6 Drawing Sheets

(58) Field of Classification Search
USPC .......................... 709/238–239; 370/229–231
See application file for complete search history.

(56) References Cited

U.S. PATENT DOCUMENTS

| | | | | |
|---|---|---|---|---|
| 2005/0074005 | A1* | 4/2005 | Okuno | H04L 45/60 370/389 |
| 2009/0083471 | A1* | 3/2009 | Frey | G06F 13/4054 710/316 |
| 2009/0141712 | A1* | 6/2009 | Maeno | H04L 45/00 370/389 |
| 2018/0152317 | A1* | 5/2018 | Chang | H04L 61/2007 |
| 2018/0367443 | A1* | 12/2018 | Shi | H04L 45/12 |
| 2019/0114197 | A1* | 4/2019 | Gong | G06F 9/45558 |
| 2020/0174954 | A1* | 6/2020 | Pope | G06Q 40/04 |

FOREIGN PATENT DOCUMENTS

| | | |
|---|---|---|
| CN | 105791315 A | 7/2016 |
| CN | 106972985 A | 3/2017 |
| CN | 107872545 A | 4/2018 |
| EP | 3171576 A1 | 5/2017 |
| WO | 2013063791 A1 | 5/2013 |

OTHER PUBLICATIONS

European Search Report for corresponding application EP18863374; dated Apr. 23, 2021.
The State Intellectual Property Office of People's Republic of China. First Search Report for CN Application No. 2017108841278 and English translation, dated Nov. 12, 2021, pp. 1-4.
The State Intellectual Property Office of People's Republic of China. First Office Action for CN Application No. 2017108841278 and English translation, dated Nov. 23, 2021, pp. 1-10.
The State Intellectual Property Office of People's Republic of China. Second Office Action for CN Application No. 2017108841278 and English translation, dated Feb. 17, 2022, pp. 1-9.
Xing, Y. "Research on Home Gateway QoS Function Based on User Online Behavior," Wuhan Institute of Posts and Telecommunications Master's Thesis, Jan. 2014, pp. 26-35.

* cited by examiner

PACKET TRANSMISSION METHOD AND DEVICE, AND COMPUTER READABLE STORAGE MEDIUM

This is a National stage application, filed under 37 U.S.C. 371, of International Patent Application NO. PCT/CN2018/106166, filed on Sep. 18, 2019, which claims priority to a Chinese patent application No. 201710884127.8 filed on Sep. 26, 2017, disclosure of which is incorporated herein by reference in its entirety.

TECHNICAL FIELD

The present disclosure relates to communications and, for example, to a packet transmission method and device, and a computer readable storage medium.

BACKGROUND

464XLAT is a packet translation technology of an Internet Protocol Version 4 (IPv4)<->Internet Protocol Version 6 (IPv6). 464XLAT (corresponding a protocol RFC6877) includes customer-side translator (CLAT) and provider-side translator (PLAT). The CLAT is a stateless translation based on a protocol RFC6145. PLAT is a stateful translation based on a protocol RFC6146. The CLAT is deployed on terminal products (such as a mobile phone and a router, etc.), and the PLAT is deployed on operator networks.

464XLAT may enable an IPv4 data packet sent by the client accessing a public network IPv4 host be translated into an IPv6 data packet by the CLAT, then sends the IPv6 data packet to the PLAT by crossing a single IPv6 network. Then the PLAT translates the received IPv6 packet into the IPv4 packet, and sends the final IPv4 packet to a destination IPv4 host on the public network. If the CLAT receives the IPv6 data packet from the client, the CLAT transmits the IPv6 data packet directly to the IPv6 network without translation. The above process is shown in FIG. 1, dash-dotted lines in FIG. 1 represent the IPv6 packets, and dashed lines represent a flow direction of the IPv4 packets. Therefore, the CLAT deployed on customer-premises equipment (CPE) works if and only if the CPE is in an IPv6 single stack network mode. In the IPv4 single stack and IPv4v6 dual stack, the function of the CLAT does not need to be enabled. In addition, the CLAT also needs to translate the IPv6 packet received from a wide area network (WAN) side server to the IPv4 packet.

However, during the translation process, the above message translation technology has problems of high central processing unit (CPU) occupation rate, low transmission rate, and poor user experience.

SUMMARY

At least one embodiment of the present disclosure provides a packet transmission method and device, and a computer readable storage medium. The CPU occupation rate is reduced and a transmission rate is improved.

At least one embodiment of the present disclosure provides a packet transmission method. The method includes: receiving a packet by the routing device, determining whether the packet is a packet that needs to be accelerated, and in response to determining that the packet is the packet that needs to be accelerated, querying a customized connection tracking table to acquire connection tracking information corresponding to the packet, transmitting the packet to a driver layer for processing, where the customized connection tracking table comprises connection tracking information of a packet corresponding to a packet type which is predetermined to be accelerated.

An embodiment of the present disclosure provides a packet transmission device, comprising a packet receiving module and an acceleration processing module.

The packet receiving module is configured to receive a packet.

The acceleration processing module is configured to determine whether the packet is a packet that needs to be accelerated, and in response to determining that the packet is the packet that needs to be accelerated, query a customized connection tracking table to acquire connection tracking information corresponding to the packet, transmit the packet to a driver layer for processing, where the customized connection tracking table comprises connection tracking information of a packet corresponding to a packet type which is predetermined to be accelerated.

An embodiment of the present disclosure provides a packet transmission device. The device includes a memory and a processor, where the memory stores a program and the packet transmission method described above is performed when the program is read and executed by the processor.

An embodiment of the present disclosure provides a computer-readable storage medium. The computer-readable storage medium is configured to store one or more programs which may be executed by one or more processors for implementing the above-mentioned method for implementing the packet transmission method.

Compared with the relating art, in the solution provided by an embodiment of the present application, the packet is divided in to a packet that needs to be accelerated and a packet that does not need to be accelerated, for the packet that needs to be accelerated, the corresponding connection tracking information is queried directly from a customized connection tracking table, so that complex processing of the standard TCP/IP protocol stack is omitted, the CPU occupation is reduced and the packet transmission rate is increased. In addition, this solution does not need to upgrade hardware, thereby not increasing costs.

BRIEF DESCRIPTION OF DRAWINGS

The drawings are provided for a further understanding of the technical solutions of the present application, and constitute a part of the description. The drawings and the embodiments of the present application are used to explain the technical solutions of the present application, and not intended to limit the technical solutions of the present application.

DETAILED DESCRIPTION

Figure 1:
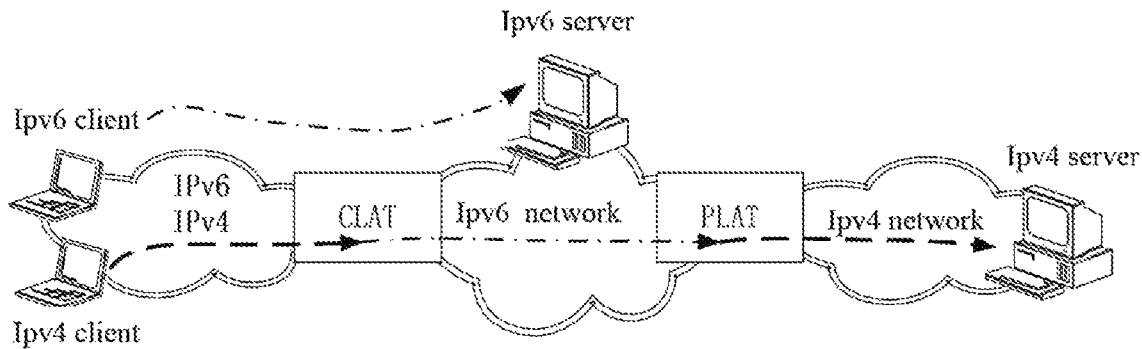
FIG. 1 is a network architecture diagram of an IPv4 and an IPv6 in the relating art.

The objects, technical solutions and advantages of the present application will be clearer from a detailed description of embodiments of the present application in conjunction with the drawings. It is to be noted that if not in collision, the embodiments and features therein in the present application may be combined with each other.

The steps illustrated in the flowcharts in the drawings may be performed by a computer system such as a group of computers capable of executing instructions. Further, although logical sequences are illustrated in the flowcharts, the shown or described steps may be performed in sequences different from those described herein in some cases.

The patent application, "Data Cache Method and Apparatus" with a publication number of CN105450703A, proposes a cache technology to solve the problem of download rate, and deploys a cache server between the client and the gateway. The cache server may be a bypass cache server or an intelligent router. The cache server usually needs to have a large storage space and may support a traditional Tracker protocol to implement data cache.

The cache server of the application listens to a data request sent by the client to a Tracker server, and parses out a key value corresponding to a target data from the data request; and then looks up the target data in the local data cache according to the key value; if the target data is not looked up, a download request is sent to the Tracker server and a distributed hash table (DHT) network separately to acquire an address index table corresponding to the target data, and download the target data to the local cache according to a download address in the received address index table.

The above cache server may send the download request to the Tracker server and the DHT network separately, so more address index tables may be acquired, thereby improving the download rate and enables the download data to be more comprehensive. Even when the Tracker server fails, the cache service is still unaffected, thereby improving system stability and saving the network bandwidth resource.

Disadvantages of this solution is that the cache server needs to be built, the cost is high, and for home gateway products, it is not realistic to sell the cache server to ordinary users.

In addition to the cache server solution proposed by the above patent, other patents propose a method of upgrading hardware for acceleration, but this method also increases the cost.

Terminal products such as a computer, a mobile phone and a tablet computer (pad) are accessed to the CPE and obtain the network address by a network cable and wireless fidelity (wifi). The overall processing logic of the IPv4/IPv6 translation is performed by the following contents 1) an 2) for the CPE itself and the data packet sent by a client accessed to the CPE.

1) If a received data packet (including the packet sent by the CPE and the packet sent by the client) are an IPv6 packet, the CPE does not need to translate the IPv6 packets and forwards it directly.

2) If the received data packet (including the packet sent from the CPE and the packet sent from the client) are an IPv4 packet, the CPE needs to translate the IPv4 packet into an IPv6 packet and send the IPv6 packet to a PLAT. After receiving a packet returned by the PLAT, The CPE translates the IPv6 packet into the IPv4 packet and returns the IPv4 packet to the CPE itself or the client.

The normal work of XLAT requires cooperation of CLAT and PLAT. CPE products, as user-side devices, are deployed with the CLAT translator, which may improve translation efficiency of the CLAT translator and the IPv4 download rate. Considering CLAT translation of the entire data flow diagram, it is found that the CLAT translation technology needs to complete is to translate the received IPv4 packets into the IPv6 packets and then send them out by considering the entire data flow diagram of the CLAT translation. In the translation process, it is necessary to perform the packet recognition, construct IPv6 packets, send packets and other processes, these processes themselves consume a large amount of memory and CPU. In addition, the linux kernel network filter (netfilter) itself will consume a large amount of memory and CPU.

The processing process of the standard linux kernel for the data packet includes: the data packet arrives at the CPE through a Long Term Evolution (LTE) air interface, performs processing on the data packet to remove the mac header on the driver layer, and the processed packet is processed by the netfilter. The packet is processed by a PREROUTING link of a mangle table and a nat table. The procession here mainly refers to a destination address translation (DNAT), i.e., convert of a destination Internet Protocol (IP) address. The destination IP of the packet sent from a network side is an IP on a WAN side of the CPE, and is converted into the IP address of the client on a local area network (LAN) side after being processed by the DNAT. After PREROUTING processing, router selection is performed. If the packet is sent to the CPE, it is processed through an input/output (INPUT/OUTPUT) link on a left side. If the packet is sent to a host on a LAN side, it is processed through a FORWARD link on a right side. Firewall filtering operation and other operations are performed by the FORWARD link. If the packets are not filtered, the packets are processed by the POSTROUTING link, Here, a source network address translation (SNAT) operation is performed. After the above processing, the packets are sent to the driver for processing and sent to a physical network card.

It may be seen that the processing logic of netfilter is very complicated, and the complicated processing logic leads to excessive CPU occupation and thus reduces the download rate of LTE→LAN. Therefore, the rate may be increased by optimizing the netfilter. In this application, the optimization of the netfilter is mainly reflected in directly taking over IP packets sent from the driver, and through internal optimization processing, the packets are sent to the driver and then sent out, saving the processing of the PREROUTING/POSTROUTING/FORWARD link of the mangle/nat/filter table.

Figure 2:
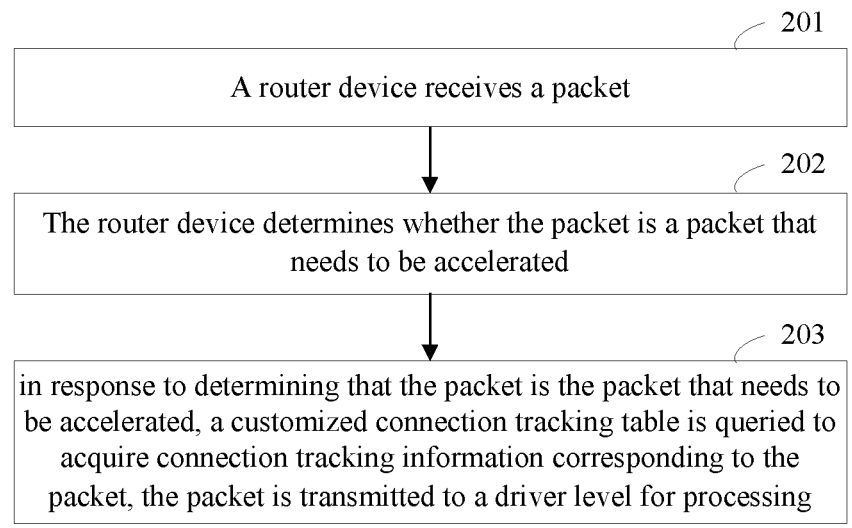
FIG. 2 is a flowchart of a packet transmission control method provided by an embodiment of the present disclosure.

An embodiment of the present disclosure provides a packet transmission method. As shown in FIG. 2, the method includes steps 201, 202 and 203.

In step 201, a router device receives a packet.

In step 202, it is determined whether the packet is a packet that needs to be accelerated.

In step 203, in response to determining that the packet is the packet that needs to be accelerated, a customized connection tracking table is queried to acquire connection tracking information corresponding to the packet, the packet is transmitted to a driver layer for processing, the customized connection tracking table includes determining the connection tracking information of the packet corresponding to a packet type which is predetermined to be accelerated.

The packet transmission method provided by the embodiment of the present application divides the packet into a packet that needs to be accelerated and a packet that does not need to be accelerated, for the packet that needs to be accelerated, the corresponding connection tracking information is looked up directly from a customized connection tracking table, so that the complex processing of the standard TCP/IP protocol stack is omitted, the CPU occupation is reduced and the packet transmission rate is increased. In the relating art, determination on whether acceleration is needed is not performed. All packets are directly processed according to the standard protocol stack, which occupies large CPU. In this application, for the packet that need to be accelerated, the customized connection tracking table may be directly queried. If the corresponding connection tracking information exists in the customized connection tracking table, the corresponding connection tracking information is directly acquired and sent to the driver layer for subsequent processing, which omits complex PREROUTING/POSTROUTING/FORWARD link processing process of the standard protocol stack, thus reducing the occupation of the CPU and increasing the message transmission rate.

The packet includes an IPv4 packet or an IPv6 packet.

In an embodiment, before determining whether the packet is a packet that needs to be accelerated, the packet is also recognized. When the packet is recognized as a destination network-type packet, whether the packet meets a translation condition is determined. If the packet meets the translation condition, the packet is determined to be the packet that needs to be accelerated. If the translation condition is not met, the packet is processed directly according to the standard protocol stack processing manner.

In an embodiment, the step 203 further comprises: in response to determining that the packet is the packet that needs to be accelerated and no connection tracking information of the packet exists in the customized connection tracking table, performing connection tracking learning on the packet, acquiring the connection tracking information of the packet, and adding the connection tracking information to the customized connection tracking table. A manner of track learning is to perform standard TCP/IP protocol processing.

In an embodiment, if the packet is a packet that does not need to be accelerated, the packet is processed according to the existing process, i.e., the packet is processed according to the standard linux protocol stack processing process, which is not repeated here.

In an embodiment, determining whether the packet is the packet that needs to be accelerated comprises: determining a packet type according to a protocol type of the packet and a port number used in a communication process, determining whether the packet is the packet that needs to be accelerated according to the packet type. Which type of the packet is the packet that needs to be accelerated may be set as needed. For example, HyperText Transfer Protocol (HTTP) packets and File Transfer Protocol (FTP) packets may be designated as packets that need to be accelerated.

In an embodiment, transmitting the packet to the driver layer for processing includes: translating the packet into a target network-type packet, determining whether the target network-type packet is the packet that needs to be accelerated, and in response to determining that the target network-type packet is the packet that needs to be accelerated, querying the customized connection tracking table to acquire the connection tracking information corresponding to the target network-type packet, and transmitting the target network-type packet to a driver layer for processing; or translating the packet into a target network-type packet, performing processing on the target network-type packet based on a standard protocol stack processing manner, and transmitting the processed target network-type packet to the driver layer for processing For example, the packet is an IPv4 packet, and the target network-type packet is an IPv6 packet, or the packet is an IPv6 packet, and the target network-type packet is an IPv4 packet.

For example, transmitting the IPv4 packet to the driver layer for processing when the packet is the IPv4 packet from a client includes: translating the IPv4 packet into the IPv6 packet, in response to determining that the IPv6 packet is the packet that needs to be accelerated, querying the customized connection tracking table to acquire the connection tracking information corresponding to the IPv6 packet, and transmitting the IPv6 packet to a driver layer for processing; or translating the IPv4 packet into the IPv6 packet, and performing processing on the IPv6 packet based on a standard protocol stack processing manner, and transmitting the processed IPv6 packet to the driver layer for processing.

For another example, transmitting the packet to the driver layer for processing when the packet is the IPv6 packet from a network side includes: translating the IPv6 packet into the IPv4 packet, in response to determining that the IPv4 packet is the packet that needs to be accelerated, querying the customized connection tracking table to acquire the connection tracking information corresponding to the IPv4 packet, and transmitting the IPv4 packet to the driver layer for processing; or translating the IPv6 packet into the IPv4 packet, and performing processing on the IPv4 packet based on the standard protocol stack processing manner, and transmitting the processed IPv4 packet to the driver layer for processing.

In an embodiment, after querying the customized connection tracking table to acquire the connection tracking information corresponding to the packet, the method further includes: updating an aging time of connection tracking information of the packet in the customized connection tracking table.

In an embodiment, before transmitting the packet to the driver layer for processing, the method further comprises: determining whether media access control layer information of the packet is empty, in response to determining that the media access control layer information is empty, filling media access control header information into the packet. The filled media access control header information is analyzed and obtained through a packet code flow.

In the below embodiment, a CPE as a router device is taken as an example for illustration. In an embodiment, the router device is not limited to a CPE, but may be other products, such as a data card, a smart terminal and a tablet computer (PAD).

Figure 3:
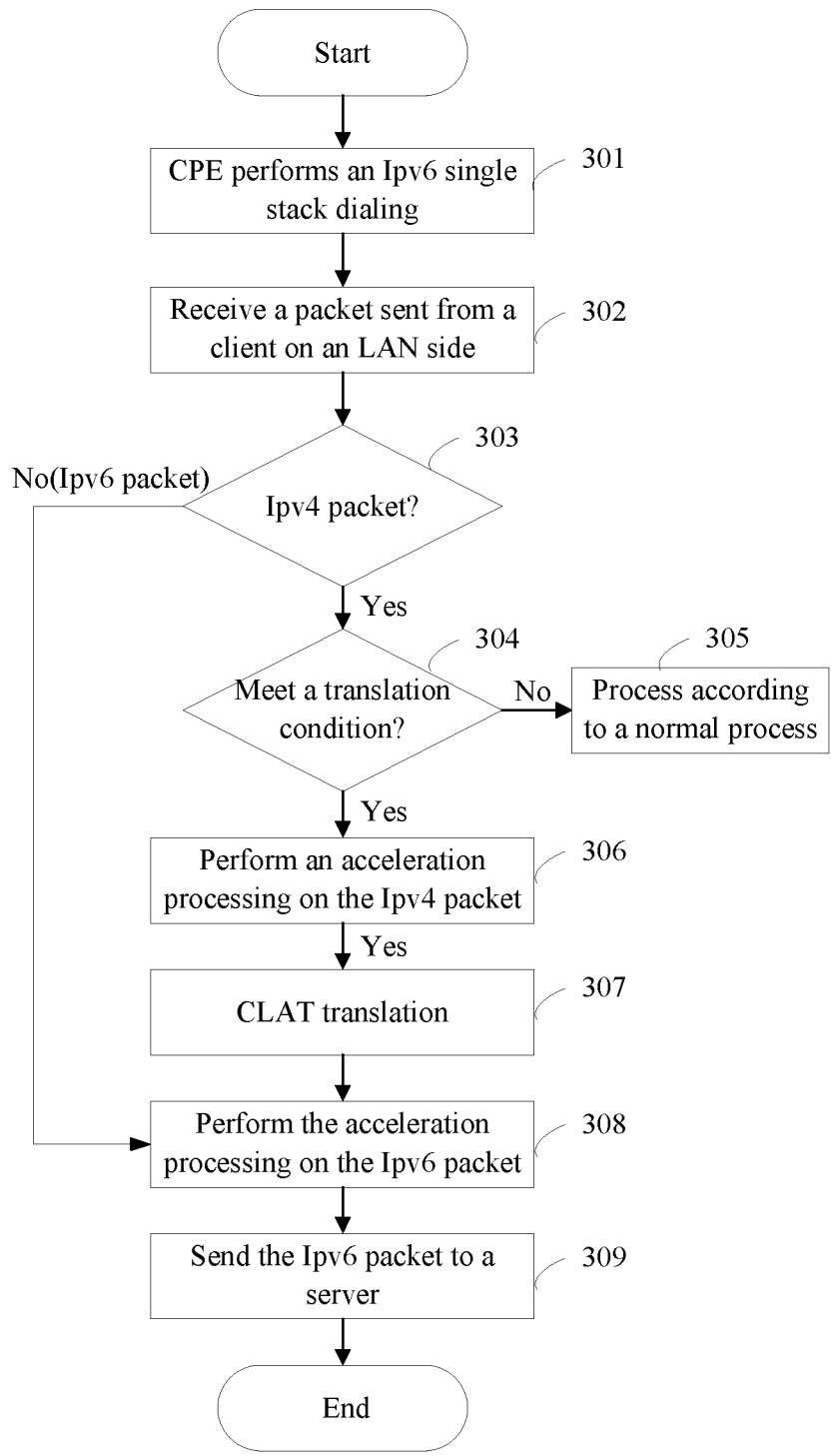
FIG. 3 is a flowchart of a packet transmission control method provided by an embodiment of the present disclosure.

FIG. 3 is a flowchart of a packet transmission method provided by an embodiment of the present application. As shown in FIG. 3, the method includes steps 301 to 309.

In step 301, an IPv6 single stack dialing is performed after a CPE is powered on. Since a CLAT work process is to translate an IPv4 packet into an IPv6 packet and sends the IPv6 packet to an IPv6 single-stack network, i.e., the network is an IPv6 single-stack network. Therefore, to meet a CLAT working scenario, the CPE needs to perform IPv6 single-stack dialing.

In step 302, the CPE receives a packet from a client on an LAN side.

For the client on the LAN side, if the client only has the IPv4 single stack installed, the CPE assigns an IPv4 private IP address to the IPv4 single stack (such as: 192.168.0.100), and the client is only able to send the IPv4 packet. If the client has the IPv6 protocol stack installed, the CPE assigns an IPv6 prefix to the IPv6 protocol stack. In this case, the client obtains an IPv6 address, and the client sends the IPv6 packet.

In step 303, whether the packet is the IPv4 packet is determined. If not, i.e., the client on the LAN side sends the IPv6 message, the CLAT does not translate the packet, and the process goes to step 308, and if the client on the LAN side sends the IPv4 packet, the process goes to step 304.

In step 304, whether the current packet meets a CLAT translation condition, and if yes, the process goes to step 306; otherwise, the process goes to step 305.

A method for determining whether the current packet meets the CLAT translation conditions is: if a source IP address of the current packet is a device gateway address or a destination address of the current packet is a broadcast address and other addresses that do not meet the translation condition, the CLAT translation condition is not met, and the current packet is not translated; otherwise, the CLAT translation condition is met.

In step 305, the packet is processed according to processing logic of a Linux standard protocol stack, and the process ends.

In step 306, an acceleration processing is performed on the IPv4 packet.

Where, performing the acceleration processing on the IPv4 packet includes: if the IPv4 packet is a packet that needs to be accelerated, querying a customized connection tracking table to acquire connection tracking information corresponding to the IPv4 packet, and sending the IPv4 packet to a driver layer for processing; if the IPv4 packet is the packet that needs to be accelerated and the connection tracking information of the IPv4 packet does not exist in the connection tracking table, performing track learning on the IPv4 packet, acquiring the connection tracking information of the packet, adding the connection tracking information to the customized connection tracking table.

In step 307, the CAT translation is performed on the IPv4 packet to obtain the IPv6 packet.

Figure 5:
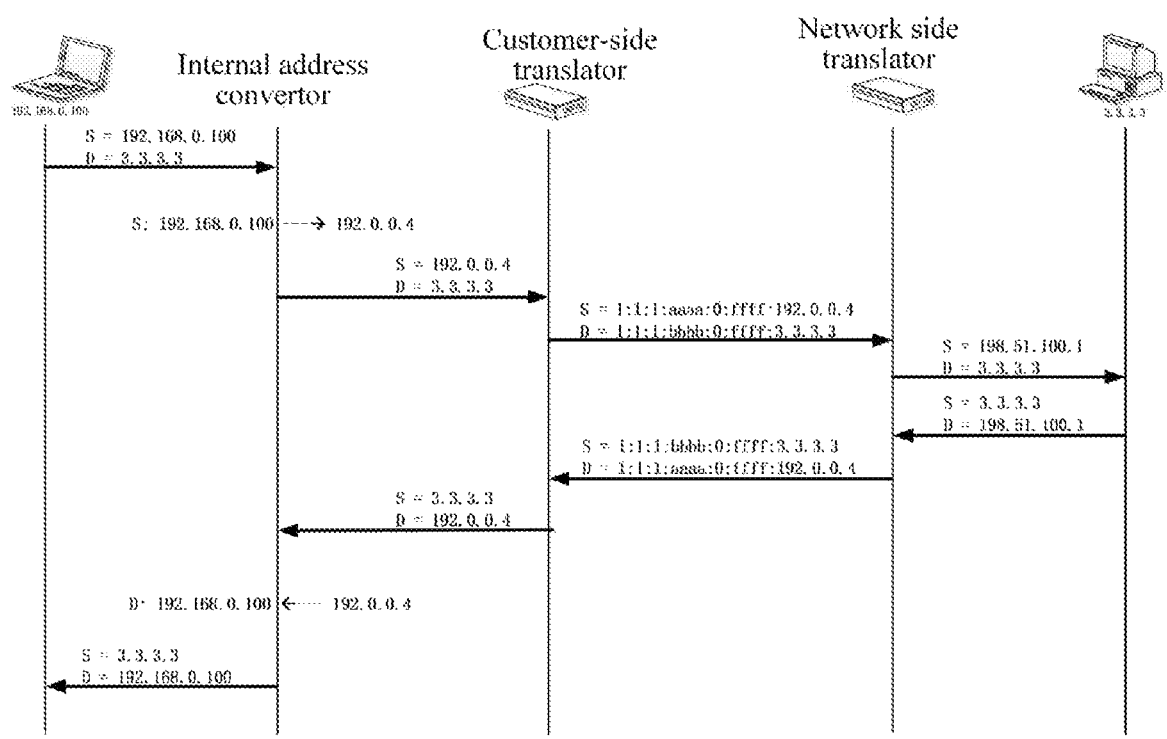
FIG. 5 is a schematic diagram of a packet translation process provided by an embodiment of the present disclosure.

In an embodiment, a translation process in step 307 is shown in FIG. 5 and includes: a host of 192.168.0.100 sends a packet to the CPE, which includes an internal address convertor and a Customer-side translator, a source address of the packet is 192.168.0.100, and a destination address is 3.3.3.3. The internal address convertor of the CPE performs an SNAT to convert the private IPv4 address 192.168.0.100 to 192.0.0.4, and then the Customer-side translator of the CPE translates the address 192.0.0.4 to 1: 1: 1: aaaa: 0: ffff: 192.0.0.4 as the IPv6 source address. The destination IPv6 address of the sent packet is [PLAT prefix+destination IPv4 address], i.e.: 1: 1: 1: bbbb: 0: ffff: 3.3.3.3, where 1: 1: 1: bbbb: 0: ffff/96 is 96 bit prefix of the PLAT server. The packet is sent to the PLAT on the network side. The PLAT converts the source address 1: 1: 1: aaaa: 0: ffff: 192.0.0.4 to 198.51.100.1, the destination address is 3.3.3.3, and sends the packet to the host of 3.3.3.3. FIG. 5 also shows the process of sending the packet from the host of 3.3.3.3 to the host of 192.168.0.100. The translation process is similar. Reference may be made to the relating art for the specific translation process, which will not be repeated here.

In step 308, an acceleration processing is performed on the IPv6 packet.

Where, performing the acceleration processing on the IPv6 packet includes: if the IPv6 packet is a packet that needs to be accelerated, querying a customized connection tracking table to acquire connection tracking information corresponding to the IPv6 packet; if the IPv6 packet is the packet that needs to be accelerated and the connection tracking information of the IPv4 packet does not exist in the customized connection tracking table, performing track learning on the IPv6 packet, acquiring the connection tracking information of the packet, adding the connection tracking information to the customized connection tracking table.

The acceleration processing of the IPv6 packet is similar to the acceleration process of the IPv4 packet.

The IPv6 packet may be the IPv6 packet sent directly by the client, or an IPv6 packet obtained by translating the IPv4 packet sent by the client.

Of course, the acceleration processing may only be performed on the IPv6 packet and not performed on the IPv4 packet.

In step 309, the IPv6 packet is transmitted to a public network IPv6 host.

In other embodiments of the present disclosure, the acceleration processing may not be performed on the IPv6 packet, i.e., in step 308, the IPv6 packet is processed based on a standard protocol stack.

Figure 4:
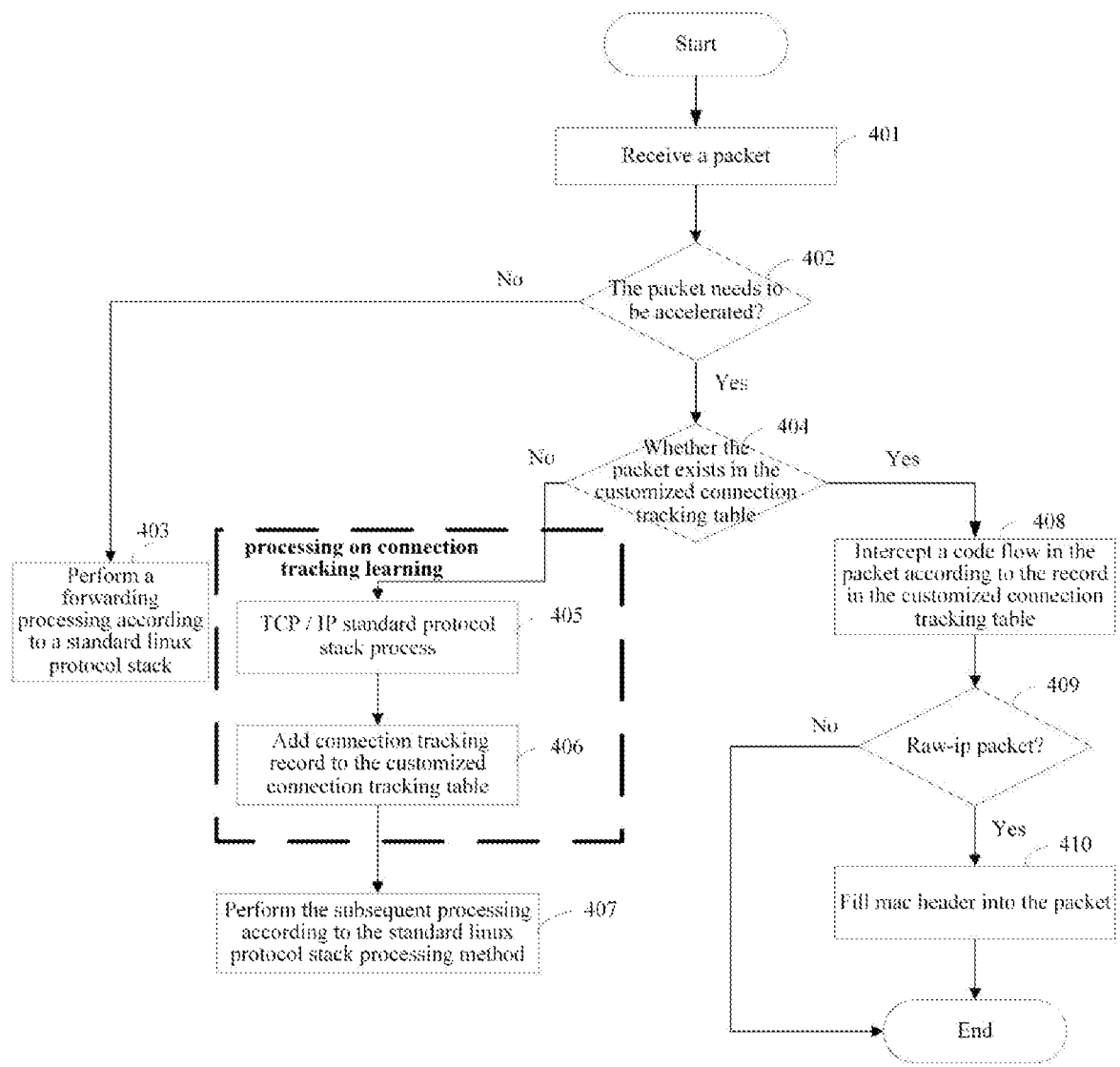
FIG. 4 is a flowchart of accelerate processing on a packet provided by an embodiment of the present disclosure.

An embodiment of the present disclosure provides an acceleration processing method on an IPv4 packet. As shown in FIG. 4, the method includes steps 401 to 410.

In step 401, a linux protocol stack receives a packet from a driver.

In an embodiment, the packet is the IPv4 packet.

In step 402, whether a current packet is a packet that needs to be accelerated is checked. If yes, the process goes to step 404; otherwise, the process goes to step 403.

The linux standard protocol stack has many types of packets, the acceleration processing may only be performed on packets corresponding to applications frequently used by part of users, such as HTTP, FTP and other packets. Of course, this is only an example, and the packet that needs to be accelerated may also be other types of packets. A method to check whether the current packet is a packet capable of being accelerated is to check a protocol type of the packet and a port used in the communication process. The packet type may be determined by the protocol type and the port number used in the communication process, and whether the packet capable of being accelerated is determined. The HTTP packet is taken as an example for description as follows. If the packet is encapsulated by a TCP protocol using a destination port 80, then the packet is an HTTP packet. If the packet is encapsulated by the TCP protocol using a destination port 21, then the packet is an FTP packet. In this case, the current packet is taken as a packet to be accelerated.

In step 403, the packet is forwarded and processed according to a standard linux protocol stack, and the process ends.

In step 404, whether the packet exists in the customized connection tracking table is checked, i.e., whether the packet has the connection tracking information in the customized connection tracking table is checked. If the current packet is not in the customized connection tracking table, the process goes to step 405; otherwise, the process goes to step 408.

In an embodiment, a format of the customized connection tracking table is the same as a format of a standard linux connection tracking table.

In step 405, if the packet is not in the customized connection tracking table, learning is required. A learning process includes: intercepting the packet before sending it to a driving program for processing after the data packet is processed by the TCP/IP standard protocol stack, and recording the connection tracking information in the packet.

The connection tracking information includes at least one of: information such as an IP, a port, and a protocol of the packet.

In step 406, the connection tracking information of the packet is added to the customized connection tracking table.

Each of the newly added connection tracking information has an aging time. The aging time follows configuration of the standard linux protocol stack for the aging time. Of course, the aging time may also be customized. The connection tracking information that exceeds the aging time is deleted.

In step 407, the subsequent processing is performed according to the standard linux protocol stack processing method, and the process ends.

In step 408, if the current packet exists in the customized connection tracking table, the connection tracking information is acquired in the customized connection tracking table.

In addition, the aging time of the connection tracking information of the packet in the customized connection tracking table is updated, such as updating the aging time to a default maximum value. Through updating the customized connection tracking table, the corresponding connection tracking information may be found in the customized connection tracking table when the same IP packet is received next time, thereby directly forwarding the IP packet without handling the packet to the CPU for processing, reducing the CPU load, and improving uploading and downloading rates while improving forwarding efficiency.

In step 409, whether the received packet is a raw-ip packet is determined before sending it to the driver layer for processing, i.e., checking whether mac layer information in the packet is empty. If the mac layer information is empty, the process goes to step 410; otherwise, the process ends.

In step 410, if the packet is the raw-ip packet, mac header information needs to be filled into the packet. The filled mac header information is obtained by analyzing a packet code flow, and the process ends.

The IPv4 packet is replaced with the IPv6 packet in the above process, i.e., an acceleration process for the IPv6 packet, which is not repeated here.

Figure 6:
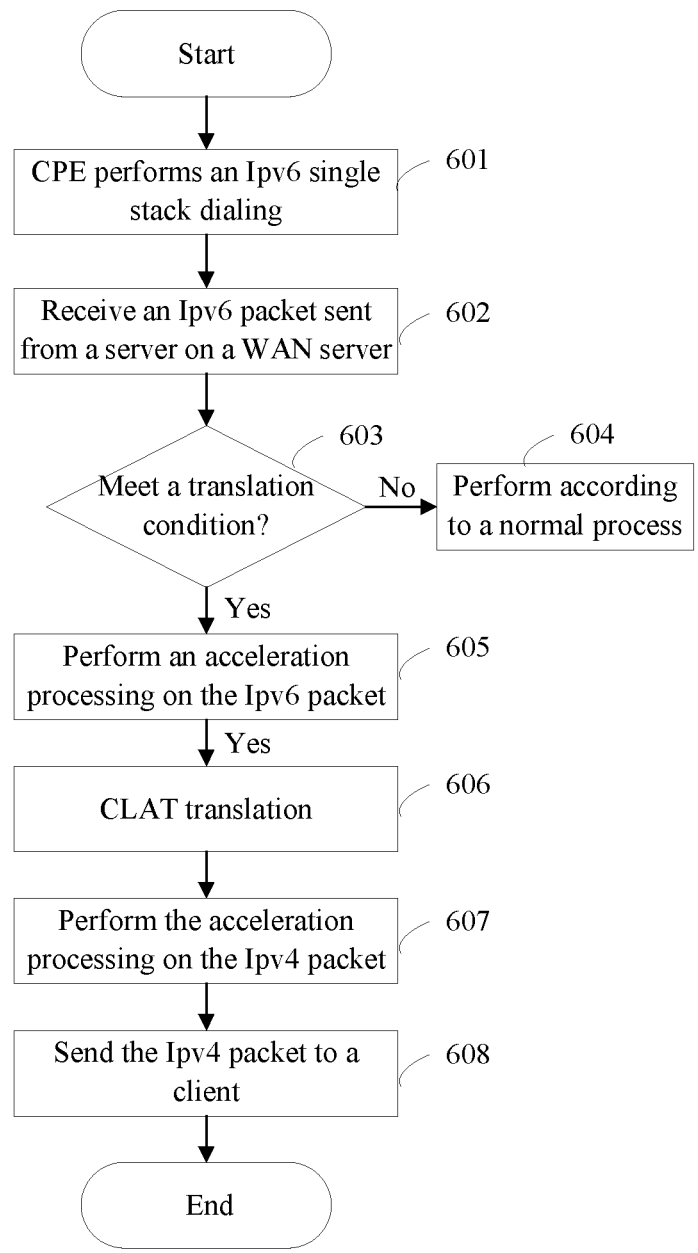
FIG. 6 is a flowchart of a packet transmission control method provided by an embodiment of the present disclosure.

FIG. 6 is a flowchart of a packet transmission method provided by another embodiment of the present disclosure. As shown in FIG. 6, the method includes steps 601 to 608.

In step 601, an IPv6 single stack dialing is performed after a CPE is powered on. Since a CLAT work process is to translate an IPv4 packet into an IPv6 packet and sends the IPv6 packet to an IPv6 single-stack network, i.e., the network is an IPv6 single-stack network. Therefore, to meet a CLAT working scenario, the CPE needs to perform IPv6 single-stack dialing.

In step 602, the CPE receives a packet from a server on a WAN side.

The packet sent from the WAN side is an IPv6 packet.

In step 603, whether a current packet meets a CLAT translation condition is determined, and if yes, the process goes to step 605; otherwise, the process goes to step 604.

A method for determining whether the current packet meets the CLAT translation conditions is: if a source IP address of the current packet is a device gateway address or a destination address is a broadcast address and other addresses that do not meet the translation condition, the CLAT translation condition is not met, and the packet is not translated; otherwise, the CLAT translation condition is met.

In step 604, the packet is processed according to processing logic of a Linux standard protocol stack, and the process ends.

In step 605, an acceleration processing is performed on the IPv6 packet.

Reference may be made to the embodiment shown in FIG. 4 for the processing process, and the IPv4 packet is replaced with the IPv6 packet.

In step 606, CAT translation is performed on the IPv6 packet after the IPv6 acceleration processing is completed.

In step 607, an acceleration processing is performed on the IPv4 packet.

Referring to the embodiment shown in FIG. 4, the acceleration processing on the IPv4 packet can be understood.

In other embodiments of the present disclosure, the acceleration processing may not be performed on the translated IPv4 packet, and of course, the acceleration processing may only be performed on the translated IPv4 packet and not the received IPv6 packet.

In step 608, the IPv4 packet is transmitted to a client on a LAN side.

In another embodiment, the rate may be further improved by combining the solution provided by the present disclosure such as replacing a CPU with better performance.

The packet transmission method provided in the above embodiment, a test download rate in CPE wired broadband mode may improve from 44.3 Mbps before optimization to 103.7 Mbps, and the test download rate in an LTE current network may improve from 30 Mbps before optimization to 63 Mbps, the specific comparison data is shown in Table 1 below.

TABLE 1

| IPv4 download rate comparison before and after optimization | | | | |
| --- | --- | --- | --- | --- |
| Test environment | Before optimization (rate: Mbps) | After optimization (rate: Mbps) | Improvement amplitude (rate: Mbps) | Improvement efficiency |
| Wired broadband | 44.3 | 103.7 | 59.4 | 134% |
| Forward LTE network | 30 | 63 | 33 | 110% |

It can be seen from Table 1, by using the packet transmission method provided in the present disclosure, the user download rate may be greatly improved after CLAT translation technology is enabled. Improvement amplitude in the current network may reach 33 Mbps, and improvement efficiency may reach 110%. The reason why the download rate is able to be improved so greatly is that the complex processing logic of the netfilter of the standard protocol stack is technically saved, and only a part of the packet to be translated paid attention to or the packet being interested in is optimized and processed to achieve fast processing from driver to driver thereby achieving rate improvement.

The related art may be applied to related terminal products such as a CPE, a data card, and a smart mobile terminal. The above embodiments illustrates by taking the CPE as an example, but the actual related art solution may be applied to other terminal products, such as: the data card, the mobile phones and the pad. In terms of technical details, they may be applied to all relevant functions that require the rate, including an FTP download rate test and a speedtest measurement, etc.

Figure 7:
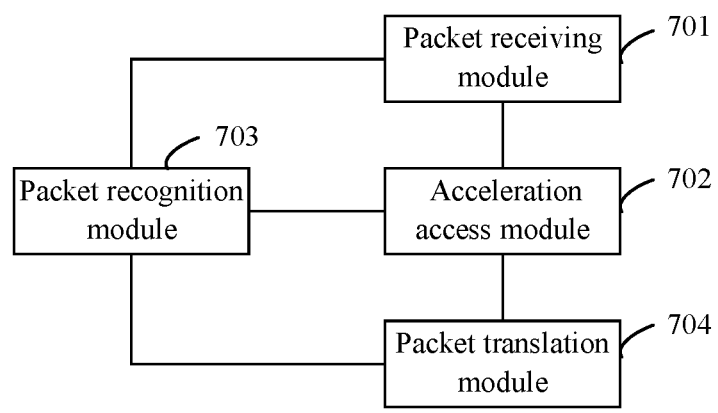
FIG. 7 is a block diagram of a packet transmission control device provided by an embodiment of the present disclosure.

An embodiment of the present disclosure provides a packet transmission device. As shown in FIG. 7, the device includes a packet receiving module 701 and an acceleration processing module 702.

The packet receiving module 701 is configured to receive a packet.

The acceleration processing module 702 is configured to determine whether the packet is a packet that needs to be accelerated, in response to determining that the packet is the packet that needs to be accelerated, query a customized connection tracking table to acquire connection tracking information corresponding to the packet, transmit the packet to a driver layer for processing. The customized connection tracking table comprises determining the connection tracking information of the packet corresponding to a packet type which is predetermined to be accelerated.

In an embodiment, the acceleration processing module 702 is further configured to: in response to determining that the packet is the packet that needs to be accelerated and no connection tracking information of the packet exists in the customized connection tracking table, perform connection tracking learning on the packet, acquire the connection tracking information of the packet, and add the connection tracking information to the customized connection tracking table.

In an embodiment, the acceleration processing module 702 is configured to determine whether the packet is the packet that needs to be accelerated comprises: determining a packet type according to a protocol type of the packet and a port number used in a communication process, determine whether the packet is the packet that needs to be accelerated according to the packet type.

In an embodiment, the packet transmission device further includes: a packet recognition module 703 and a packet translation module 704.

The packet recognition module 703 is configured to recognize a packet type of the packet.

The packet translation module 704 is configured to translate the packet into a target network type packet when the packet type is inconsistent with a target network type.

The acceleration processing module 702 is configured to transmit the packet to the driver layer for processing by: determining whether the target network-type packet is the packet that needs to be accelerated, and in response to determining that the target network-type packet is the packet that needs to be accelerated, querying the customized connection tracking table to acquire the connection tracking information corresponding to the target network-type packet, and transmitting the target network-type packet to a driver layer for processing; or performing processing on the target network-type packet based on a standard protocol stack processing manner and transmitting the processed target network-type packet to the driver layer for processing.

For example, when the packet is the IPv4 packet from the client, the target network-type packet is the IPv6 packet; and when the packet is the IPv6 packet on a network side, and the target network-type packet is the IPv4 packet.

For example, when the packet recognition module 703 recognizes the packet is the IPv4 packet from the client, the packet translation module 704 translates the IPv4 packet to the IPv6 packet, the acceleration processing module 702 determines whether the IPv6 packet is the packet that needs to be accelerated, if the IPv6 packet is the packet that needs to be accelerated, query the customized connection tracking table to acquire the connection tracking information corresponding to the IPv6 packet, and transmit the IPv6 packet to a driver layer for processing; or the acceleration processing module perform processing on the IPv6 packet based on a standard protocol stack processing manner, and transmit the processed IPv6 packet to the driver layer for processing. When the packet recognition module 703 recognizes the packet is the IPv6 packet from the client, in this case, the packet does not need to be translated. The acceleration processing module 702 determines whether the IPv6 packet is the packet that needs to be accelerated. If the IPv6 packet is the packet that needs to be accelerated, the customized connection tracking table is queried to acquire the connection tracking information corresponding to the IPv6 packet, and the IPv6 packet is transmitted to a driver layer for processing; or after the IPv6 packet is performed based on a standard protocol stack processing manner, the performed IPv6 packet is transmitted to the driver layer for processing.

For another example, when the packet recognition module 703 recognizes the packet is the IPv6 packet from the network side, the packet translation module 704 translates the IPv6 packet to the IPv4 packet, the acceleration processing module 702 determines whether the IPv4 packet is the packet that needs to be accelerated. If the IPv4 packet is the packet that needs to be accelerated, the customized connection tracking table is queried to acquire the connection tracking information corresponding to the IPv4 packet, and the IPv4 packet is transmitted to a driver layer for processing; or the acceleration processing is not performed, after the IPv4 packet is performed based on a standard protocol stack processing manner, the performed IPv4 packet is transmitted to the driver layer for processing.

In an embodiment, the acceleration processing module 702 is further configured to update an aging time of connection tracking information of the packet in the customized connection tracking table after querying the customized connection tracking table to acquire the connection tracking information corresponding to the packet.

In an embodiment, the acceleration processing module 702 is further configured to before transmit the packet to the driver layer, determine whether media access control layer information of the packet is empty, and in response to determining that the media access control layer information is empty, fill media access control header information into the packet.

An embodiment of the present disclosure provides a packet transmission device. The device includes a memory and a processor, where the memory stores a program and the packet transmission method described in any one of the preceding embodiments is performed when the program is read and executed by the processor.

One embodiment of the present disclosure provides a computer-readable storage medium. The computer-readable storage medium is configured to store one or more programs which may be executed by one or more processors for performing the packet transmission method of any one of embodiments mentioned above.

The computer-readable storage medium includes a U disk, a Read-Only Memory (ROM), a Random Access Memory (RAM), a mobile hard disk, a magnetic disk, an optical disk or a plurality of media capable of storing program codes.

Although the embodiments disclosed by the present application are as described above, the content thereof is merely embodiments for facilitating the understanding of the present application and is not intended to limit the present application. Any person skilled in the art to which the present application pertains may make any modifications and variations in the implementation forms and details without departing from the spirit and scope disclosed by the present application, but the patent protection scope of the present application is still subject to the scope defined by the appended claims.

What is claimed is:

1. A packet transmission method, comprising:
receiving, by a routing device, a packet;
determining whether the packet is a packet that needs to be accelerated; and
in response to determining that the packet is the packet that needs to be accelerated, querying a customized connection tracking table to acquire connection tracking information corresponding to the packet, transmitting the packet to a driver layer for processing, wherein the customized connection tracking table comprises connection tracking information of a packet corresponding to a packet type which is predetermined to be accelerated, and the connection tracking information comprises a source internet protocol (IP), a destination IP, a source port, a destination port, and a protocol of the packet;
wherein transmitting the packet to the driver layer comprises:
translating the packet into a target network-type packet;
determining whether the target network-type packet is the packet that needs to be accelerated according to a protocol type of the packet, a IP and a port number used in a communication process;
in response to determining that the target network-type packet is the packet that needs to be accelerated, querying the customized connection tracking table to acquire connection tracking information corresponding to the target network-type packet; and
transmitting the target network-type packet to the driver layer for processing.

2. The method of claim 1, further comprising: in response to determining that the packet is the packet that needs to be accelerated and no connection tracking information of the packet exists in the customized connection tracking table, performing connection tracking learning on the packet, acquiring the connection tracking information of the packet, and adding the connection tracking information to the customized connection tracking table.

3. The method of claim 1, wherein the packet comprises an Internet protocol version four (IPv4) packet, or an Internet protocol version six (IPv6) packet.

4. The method of claim 1, wherein
the packet is an IPv4 packet from a client, the target network-type packet is an IPv6 packet; or
the packet is the IPv6 packet from a network side, the target network-type packet is the IPv4 packet.

5. The method of claim 1, wherein before transmitting the packet to the driver layer, the method further comprises:
determining whether media access control layer information of the packet is empty, and in response to determining that the media access control layer information is empty, filling media access control header information into the packet.

6. A packet transmission device, comprising a processor and a memory for storing executable instructions that when executed by the processor cause the processor to perform the steps in following modules:
a packet receiving module, which is configured to receive a packet;
an acceleration processing module, which is configured to determine whether the packet is a packet that needs to be accelerated, and in response to determining that the packet is the packet that needs to be accelerated, query a customized connection tracking table to acquire connection tracking information corresponding to the packet, transmit the packet to a driver layer for processing, wherein the customized connection tracking table comprises connection tracking information of a packet corresponding to a packet type which is predetermined to be accelerated, and the connection tracking information comprises a source internet protocol (IP), a destination IP, a source port, a destination port, and a protocol of the packet;
wherein the processor further perform the steps in following modules:
a packet recognition module, which is configured to recognize a packet type of the packet;
a packet translation module, which is configured to translate the packet into a target network-type packet in a case where the packet type is inconsistent with a target network type;
wherein the processor transmits the packet to the driver layer for processing by:
determining whether the target network-type packet is the packet that needs to be accelerated according to a protocol type of the packet, a IP and a port number used in a communication process,
in response to determining that the target network-type packet is the packet that needs to be accelerated, querying the customized connection tracking table to acquire connection tracking information corresponding to the target network-type packet, and
transmitting the target network-type packet to the driver layer for processing.

7. The method device of claim 6, wherein the acceleration processing module is further configured to:
perform connection tracking learning on the packet, acquire the connection tracking information of the packet and add the connection tracking information to the customized connection tracking table in response to determining that the packet is the packet that needs to be accelerated and no connection tracking information of the packet exists in the customized connection tracking table.

8. The device of claim 6, wherein the packet comprises an Internet protocol version four (IPv4) packet, or an Internet protocol version six (IPv6) packet.

9. The device of claim 6, wherein
the packet is an IPv4 packet from a client, the target network-type packet is an IPv6 packet; or
the packet is the IPv6 packet from a network side, the target network-type packet is the IPv4 packet.

10. The device of claim 6, wherein the acceleration processing module is further configured to:
before transmit the packet to the driver layer, determine whether media access control layer information of the packet is empty, in response to determining that the media access control layer information is empty, fill media access control header information into the packet.

11. A non-transitory computer-readable storage medium storing at least one program, wherein the at least one program is executable by at least one processor, to perform the following steps:
receiving, by the routing device, a packet;
determining whether the packet is a packet that needs to be accelerated; and
in response to determining that the packet is the packet that needs to be accelerated, querying a customized connection tracking table to acquire connection tracking information corresponding to the packet, transmitting the packet to a driver layer for processing, wherein the customized connection tracking table comprises connection tracking information of a packet corresponding to a packet type which is predetermined to be accelerated, and the connection tracking information comprises a source internet protocol (IP), a destination IP, a source port, a destination port, and a protocol of the packet;

wherein transmitting the packet to the driver layer comprises:

translating the packet into a target network-type packet;

determining whether the target network-type packet is the packet that needs to be accelerated according to a protocol type of the packet, a IP and a port number used in a communication process;

in response to determining that the target network-type packet is the packet that needs to be accelerated, querying the customized connection tracking table to acquire connection tracking information corresponding to the target network-type packet; and transmitting the target network-type packet to the driver layer for processing.

* * * * *

UNITED STATES PATENT AND TRADEMARK OFFICE
CERTIFICATE OF CORRECTION

PATENT NO. : 11,356,410 B2
APPLICATION NO. : 16/649744
DATED : June 7, 2022
INVENTOR(S) : Fei Gao It is certified that error appears in the above-identified patent and that said Letters Patent is hereby corrected as shown below:

On the Title Page

The Left Column, Item (71), under "Applicant" reads:
"XI'AN ZHONGXING NEW SOFTWARE CO. LTD., Shaanxi (CN)"

Should read:
"XI'AN ZHONGXING NEW SOFTWARE CO., LTD., Xian (CN)"

The Left Column, Item (73), under "Assignee" reads:
"ZTE CORPORATION, Shenzhen (CN)"

Should read:
"XI'AN ZHONGXING NEW SOFTWARE CO., LTD., Xian (CN)"

Signed and Sealed this
Sixth Day of June, 2023

Katherine Kelly Vidal
*Director of the United States Patent and Trademark Office*